Patented Nov. 21, 1933

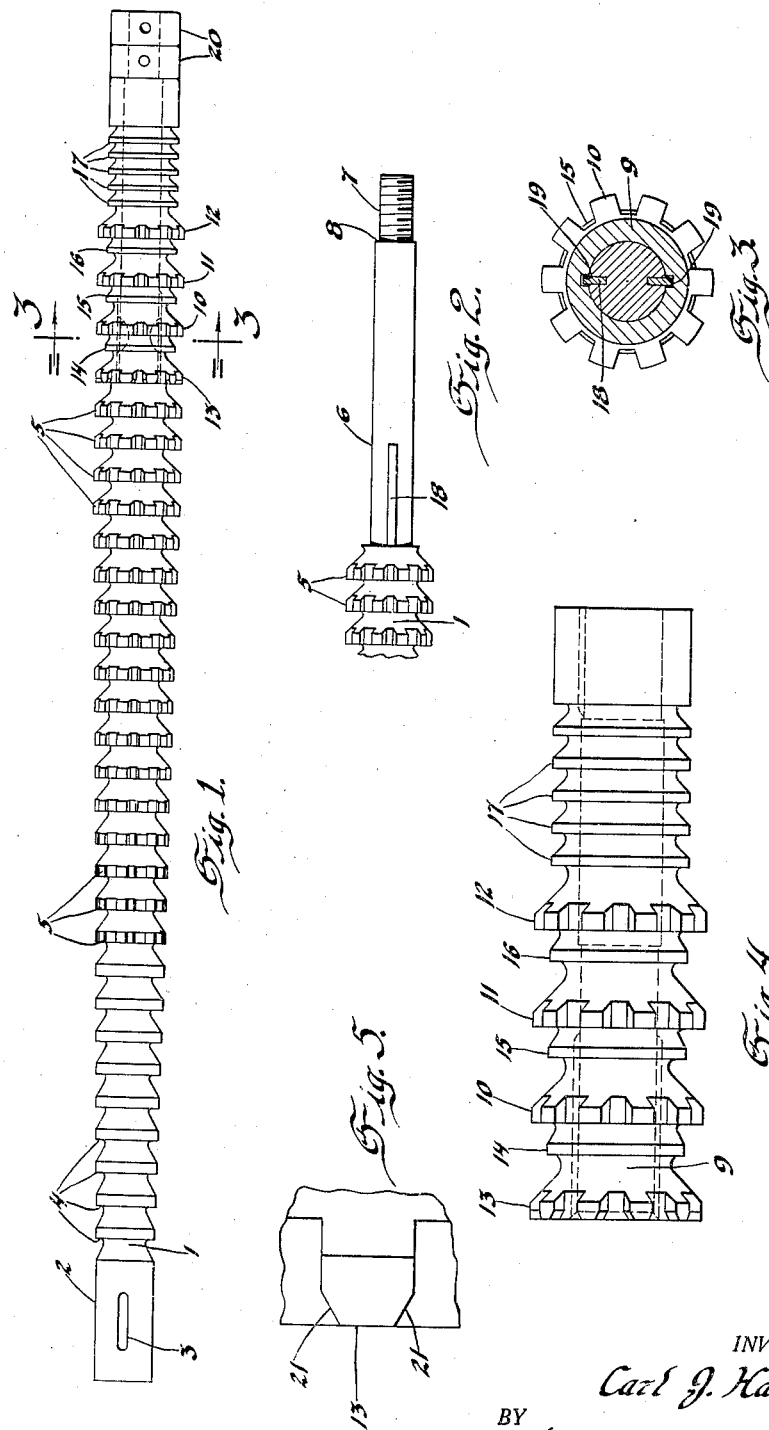

1,935,774

UNITED STATES PATENT OFFICE 1,935,774

BROACH

Carl J. Halborg, Detroit, Mich., assignor to Colonial Tool Company, Detroit, Mich., a corporation of Michigan Application June 26, 1929. Serial No. 373,738

10 Claims. (Cl. 90—33)

This invention relates to broaches, and particularly to deep cutting broaches of the pull type, the principal object being the provision of a new and novel construction designed for more efficient and economical use.

Another object is to provide a broach provided with alternate toothed and circumferentially unbroken cutting edges.

Another object is to provide a broach provided with alternate toothed and circumferentially unbroken cutting edges followed by a succession of circumferentially unbroken cutting edges of substantially the same diameter.

Another object is to provide a pull type of spline broach in which the toothed cutters are followed by a plurality of circumferentially unbroken cutters for finally sizing the bore of the article being machined thereby.

Another object is to provide a pull type of spline broach in which the toothed cutters at the end of the broach governing the final size of the grooves cut by the broach are spaced from each other longitudinally of the broach by circumferentially unbroken cutters controlling the final size of the bore of the article being machined.

Another object is to provide a broach in which a number of the largest cutting edges are formed as part of a removable or replaceable member so that when the cutters become so worn as to destroy the further efficiency of the broach, the removable member may be replaced by a new member and the broach thereby re-adapted to form openings of the originally required size.

A further object is to adapt such a removable member to be quickly applied to and removed from a pull type of broach and to provide for accurately aligning the groove forming cutting teeth formed on such member with the corresponding teeth on the main body of the broach.

The above being among the objects of the present invention, the same consists in certain novel features of construction and combinations of parts to be hereinafter described with reference to the accompanying drawing, and then claimed, having the above and other objects in view.

In the accompanying drawing which shows a suitable embodiment of the present invention, and in which like numerals refer to like parts throughout the several different views;

Fig. 1 is a side view of a broach constructed in accordance with the present invention.

Fig. 2 is a fragmentary view showing in side elevation the end of the main broach portion which is formed to receive the removable member thereon.

Fig. 3 is an enlarged sectional view taken on the line 3—3 of Fig. 1.

Fig. 4 is an enlarged side view of the removable end member.

Fig. 5 is an enlarged fragmentary plan view showing one of the guiding teeth provided at the leading edge of the removable member for properly aligning the toothed cutters of the removable member with the toothed cutters of the main body portion.

Where a gear or other member is to be fitted upon a splined shaft such member is usually machined to provide grooves extending radially of its bore, for the purpose of receiving the splines on a shaft or like object, by a broaching operation. In view of the fact that such grooves, of necessity, must be of relatively great depth, it is conventional practice to employ a broach of relatively great length so that the grooves may be formed in the member by one pass of the broaching tool instead of employing a plurality of shorter broaches. This type of broaching tool is commonly known as the "pull" type because of the necessity of pulling the broach through the work instead of pushing it through the work, due to the liability of breakage. These broaches are formed with a relatively great number of cutting edges over their length. They must be made of the highest quality of steel, due to the tremendous strains that they are sometimes subjected to. A great amount of extremely accurate machine work must be done upon them to bring them to their finished condition. Accordingly, such broaches are extremely expensive. Furthermore, in view of the fact that the work to which such broaches are put requires extremely close and accurate limits in the machining of the final product, as soon as the finishing teeth, or those cutting edges which control the final size of the surface being machined, are worn to a point where the surface being machined is no longer within the required dimensional limits, the broach must either be scrapped or else ground down to a smaller size when possible. For this reason, the life of a broach may be said to be relatively limited, for its life is governed by the wear of a relatively small number of cutting edges thereon, and this, in view of the fact that the wear on the remaining cutting edges is of little or no consequence, as far as the life of the broach itself is concerned, inasmuch as such cutting edges may be readily reground or sharpened, and their size has very little, if any, effect on the size of the finished surface. Consequently, it is the primary purpose of the present invention to provide a pull type of broach wherein those cutting edges which have heretofore controlled the life of the broach may be replaced and the life of the broach be thereby indefinitely extended, resulting in considerably lower machining cost on the articles operated on thereby. Certain other advantageous features of construction have been incorporated in the embodiment shown in the drawing, and which will be brought out in the following description.

Referring to Fig. 1, I show a broach of the type employed for finishing the bore of a gear or other member adapted to be received upon a splined shaft having a multiplicity of splines. The broach comprises a main body portion or leading member 1 having at one end thereof a pulling shank 2 provided with an opening 3 adapted to receive a key for locking it to a pulling head. From the pulling shank 2 the broach is provided first with a plurality of preferably circumferentially unbroken cutting edges 4 gradually increasing in diameter. The number of these cutting edges 4 may vary, although nine are shown in the drawing. Following these cutting edges 4 a plurality of interrupted or splineway or slot-cutting edges 5 are provided, the toothed portions of which gradually increase in diameter from the cutting edges 4 to adjacent the rear end of the main broach body where the toothed cutting edges are of substantially, though slightly smaller size, than the size of the desired surface to be finally produced in the article machined.

As indicated in Fig. 2, there extends rearwardly from the main body of the broach 1 and concentric therewith, a post-like stem portion 6 terminating at its rear end in a threaded stud portion 7 providing a shoulder 8. Received upon this post 6 is a supplementary or "following" broach member comprising a main body portion 9 upon which are shown three toothed cutters 10, 11 and 12. Forwardly of the toothed or notched and forwardly bevelled integral guide element or cutters 10 is a circumferentially toothed portion 13. Between the toothed portions 10 and 13 a circumferentially unbroken cutting edge 14 is provided, and between the cutting edges 10 and 11, and 11 and 12 similar cutting edges 15 and 16 respectively are provided. Following the toothed cutter 12 a series of circumferentially unbroken cutting edges 17 are provided. The post 6 is provided with keys 18 and the bore of the body 9 with keyways 19 which loosely receive the keys 18. The supplementary broach member is secured on the post by a pair of nuts 20 threaded on to the stud 7, and the relation of the shoulder 8 to the length of the supplementary broach member is preferably such that when the forward nut 20 is screwed against the shoulder 8 the supplementary member is thereby provided with a thrust bearing cooperating with its end surface, so that it may have a slight amount of circumferential movement on the post 6. The key-ways 19 are so formed relative to the various teeth on the portions 10, 11 and 12 that such teeth are in approximate alignment or registration with the teeth on the toothed cutters 5 on the main broach body. The forward toothed portion 13 of the supplementary member is not intended as a cutting edge and its teeth, which are in longitudinal alignment with the teeth of the cutting edges 10, 11 and 12, are bevelled as at 21 (see Fig. 5) so as to engage the work being machined, and automatically guide the teeth of the cutters 10, 11 and 12 through the work in absolute alignment with the teeth of the cutters 5 which have been previously passed through it, the limited amount of rotational or circumferential movement of the supplementary member on the post 6, permitting this guiding movement of the toothed portion 13 to be effective.

The size of the toothed cutting edges 11 and 12 are preferably the same and such as to result in a machined surface of the required dimensional limitations. The toothed cutting edge 10 may be of the same size as the cutting edges 11 and 12, or slightly smaller, and by slightly smaller it is meant preferably not more than one or two one-thousandths of an inch. The circumferentially unbroken cutting edges 17 are preferably all of the same diameter which is equal to that of the final bore of the article being machined, and the cutting edges 16, 15 and 14 are uniformly reduced in size from the size of the cutting edges 17.

The result of this construction is that the toothed cutting edges 11 and 12, and in some cases 10, control the size of the grooves in the finished product, and the cutting edges 17 control the size of the bore in the finished product. By alternating the circumferentially unbroken cutting edges 14, 15 and 16 with the toothed cutting edges 10, 11 and 12, I find that a much smoother finished surface results, and one that is free from burrs. As the bore of the articles machined by a broach of this type must necessarily be maintained within very limited tolerances, the provision of a plurality of cutting edges 17 insures a greater length of life to the broach as respects the bore of the article, as in such case the control of the final size of the bore is gradually transferred from each of the cutting edges 17 to its following cutting edge as the preceding cutting edge becomes worn in use.

The supplementary member illustrated in Fig. 4, and which controls the dimensions of the finally machined surfaces is, as illustrated, of a relatively small proportion of the total length of the broach assembly, and consequently its cost is proportionately smaller. When the various cutting edges of the supplementary member have worn to a point where they no longer maintain the surface to be machined within the required dimensional limits, the supplementary member may be removed and scrapped, and replaced by a new member, which thereby renders the broach as fit for service as it was originally. By this means I am enabled to extend the life of the main broach body to many times the life of the conventional type of this type of broaches, and the broaching cost of each unit operated upon by this type of broach is therefore considerably reduced over the cost of machining with the conventional type of broach, and a more perfect and uniform surface is obtained.

While my invention, in its broader aspect, primarily relates to the employment of the replaceable finishing portion of the broach, it will be obvious that the arrangement of cutting surfaces on the supplementary member may well be employed in conventional types of broaches not having the replaceable member, and it will be evident that I do not desire to limit this last feature of my invention to a replaceable element. It will also be recognized that neither do I limit the construction of my supplementary member to the exact construction shown in the drawing, that this may be varied to suit the various tastes or conditions.

Formal changes may be made in the specific embodiment of the invention described without departing from the spirit or substance of the broad invention, the scope of which is commensurate with the appended claims.

For example, it will be understood that although the described broach includes both a "leading" and a "following" member (the teeth thereof being graduated with reference to one another and the outside diameter of the first spline-way cutting element being but slightly greater than that of an immediately preceding element of an initial series of cutting elements provided with uninterrupted edges) each of said members normally include features of construction which, although especially appropriate to its indicated position and mode of use, are believed to be of somewhat general utility. This utility is believed to be independent of the number of broach members employed, and independent of the means relied on (in the manner of the shank 6) to keep said members in coaxial relationship when a plurality of members are employed. It may also be independent of the means relied on (in the manner of the ends of the replaceable member and the cooperating bearing surfaces provided at the ends of the mentioned shank, and the nut and the key thereon) to permit and to limit rotational play between said members; and independent also of the means employed (in the manner of the nuts 20 and associated parts) to render either or any of the members easily replaceable, and/or the means employed (in the manner of the circumferentially notched and bevelled guide element 13) near the forward end of the "following" member to afford guidance to the teeth thereon. It will, however, be noted that the described broach preferably includes both an initial series of uninterrupted cutting elements and a final series of such elements,—only the former being graduated and both a graduated slot-cutting series and an ungraduated slot-cutting series being disposed between said initial series and said final series.

What I claim is:

1. A broach comprising a primary member formed with a longitudinal series of circumferentially extending cutters of progressively increasing size, a renewable member having cutters continuing the progression formed by those of the primary member, and means for detachably connecting said members,—said primary member including a post from which projects a key, and said additional member being provided with a keyway loosely engaging said key, to permit a slight circumferential play between said members.

2. A broach comprising a primary member having a series of annular cutters progressively increasing in diameter, and correspondingly formed with spline-way cutting teeth, a stem rigidly projecting from said member at its larger end, a renewable member bored to engage said stem and formed with a plurality of spline-way cutters approximating the maximum diameter of those upon the primary member, means for positioning the renewable member to align its cutting teeth with those of the primary member, affording said renewable member a slight rotation on said stem, the teeth of the forward cutter on the renewable member being chamfered to guide them into the spline-ways formed by the teeth on the primary member.

3. A broach comprising: a toothed leading member; a separately replaceable toothed following member having limited rotational play relatively thereto; and means, distinct from the teeth of said members, automatically aligning the teeth of said following member with those of said leading member,—one of said members providing a series of uninterrupted cutting edges in alternating arrangement with interrupted edges constituting the teeth of said member.

4. A broach comprising: a toothed leading member; a separately replaceable toothed following member having limited rotational play relatively thereto; and means, distinct from the teeth of said members, automatically aligning the teeth of said following member with those of said leading member,—one of said members providing a series of uninterrupted cutting edges in alternating arrangement with interrupted edges constituting the teeth of said member, and said uninterrupted cutting edges and said interrupted cutting edges being arranged in separately graduated series.

5. A broach comprising: a member providing a series of uninterrupted cutting edges and a series of interrupted cutting edges, said uninterrupted cutting edges and interrupted cutting edges being arranged in separately graduating series and each of said series being completed by a plurality of like elements, cutting to a uniform diameter for each series.

6. In a broach: graduated means to cut to a predetermined inside diameter; means, graduated continuously with the mentioned means, to cut slots to a predetermined greater diameter; and means thereafter to cut said inside diameter to a finished diameter intermediate between the mentioned diameters.

7. In a broach: graduated means to cut to a predetermined inside diameter; graduated means to cut slots to a predetermined greater diameter; and separately replaceable means to thereafter enlarge said diameters respectively to a finished inside diameter and a finished slot diameter.

8. In a broach: graduated means to cut to a predetermined inside diameter; graduated means to cut slots to a predetermined greater diameter; and separately replaceable means to thereafter enlarge said diameters respectively to a finished inside diameter and to a finished slot diameter,—said last-mentioned means being so secured to a previously-mentioned means as to permit a limited relative rotation between said means, and said replaceable means being provided with means for its guidance relatively to said slot-cutting means.

9. The combination with a broach having a body portion and a stem portion, of: a replaceable member associated with said stem portion and provided with alternating interrupted and uninterrupted cutting elements respectively effective to increase an inside diameter and to increase a spline-slot diameter.

10. The combination with a broach having a body portion and a stem portion, of: a replaceable member associated with said stem portion and provided with alternating interrupted and uninterrupted cutting elements respectively effective to increase an inside diameter and to increase a spline-slot diameter, and with at least one final series of uniform-diameter cutting elements.

CARL J. HALBORG.